United States Patent [19]

Lapsys

[11] 4,407,550
[45] Oct. 4, 1983

[54] RESILIENT BAND STRUCTURE HAVING IMPROVED LAMINATED CORE AND DRIVE SHOES

[75] Inventor: Algis L. Lapsys, Oakland, Mich.

[73] Assignee: The United States of America as represented by the Secretary of the Army, Washington, D.C.

[21] Appl. No.: 245,481

[22] Filed: Mar. 19, 1981

[51] Int. Cl.$^3$ .............................................. B62D 55/24
[52] U.S. Cl. .................................. 305/35 EB; 305/38; 305/57
[58] Field of Search ............. 305/35 R, 35 EB, 37–39, 305/57, 6–7, 19; 180/9.2

[56] References Cited

U.S. PATENT DOCUMENTS

| 3,607,497 | 9/1971 | Chrobak | 305/35 EB X |
| 4,269,457 | 5/1981 | Farrior | 305/35 EB X |

FOREIGN PATENT DOCUMENTS

| 164321 | 8/1922 | United Kingdom | 305/38 |
| 413729 | 7/1934 | United Kingdom | 305/38 |
| 463902 | 4/1937 | United Kingdom | 305/38 |

*Primary Examiner*—Charles A. Marmor
*Attorney, Agent, or Firm*—Peter A. Taucher; John E. McRae; Nathan Edelberg

[57] ABSTRACT

An annular resilient band structure designed for installation on a ground vehicle to provide tractive propulsion force and vehicle suspension force. Resilient suspension function is achieved by an annular resilient leaf spring core encapsulated within an elastomeric sheath. Load transfer between the ground or vehicle and the band structure is obtained by plies or cords trained along the surfaces of the core between non-extensible beads at opposite side edges of the band structure. Propulsion capability is achieved by metallic drive shoes rivetted onto edge areas of the elastomeric sheath.

5 Claims, 13 Drawing Figures

U.S. Patent  Oct. 4, 1983  4,407,550
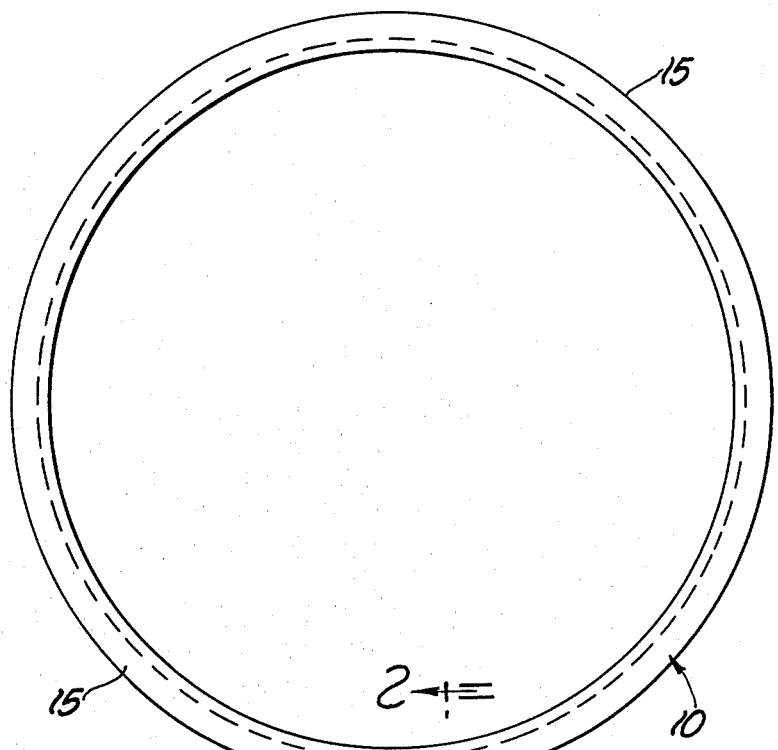
Fig.1
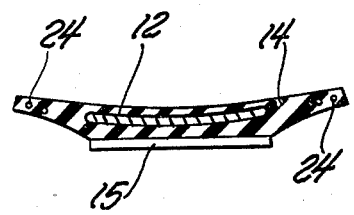
Fig.2
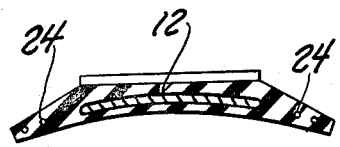
Fig.4
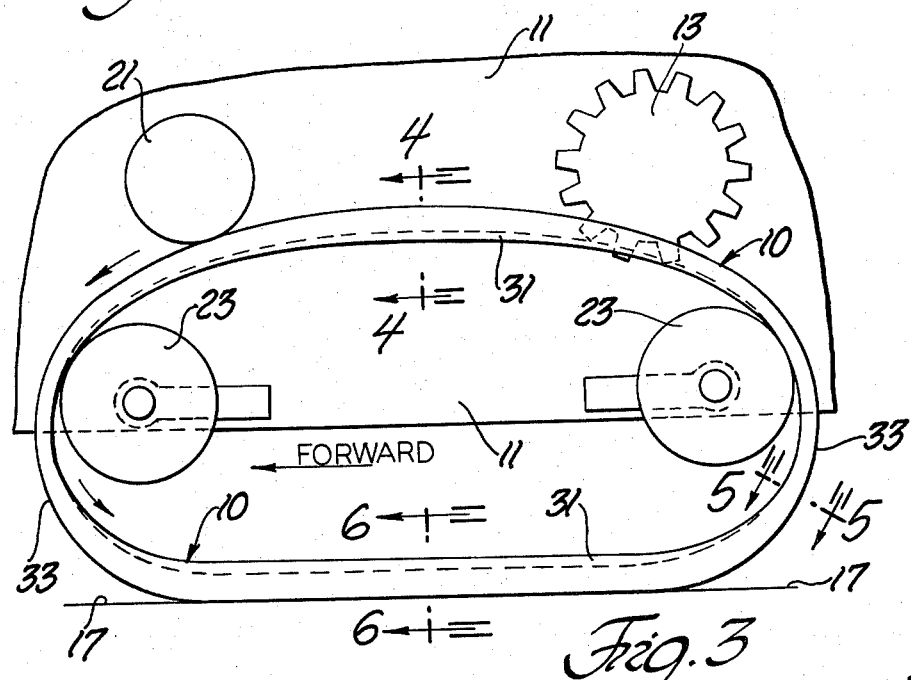
Fig.3
Fig.5
Fig.6

RESILIENT BAND STRUCTURE HAVING IMPROVED LAMINATED CORE AND DRIVE SHOES

The invention described herein may be manufactured, used, and licensed by or for the Government for governmental purposes without payment to me of any royalty thereon.

BACKGROUND AND SUMMARY OF THE INVENTION

This invention relates to a resilient band structure for use in a vehicle to provide tractive propulsion force and suspension force. One particular environment capable of using my invention is shown in my co-pending patent application Ser. No. 244,548 filed on Mar. 16, 1981. The invention has as its principal aim the attainment of a resilient band structure that incorporates a variable rate leaf spring core capable of being reused should the encapsulating sheath be worn out due to abrasion, shock, fatigue, etc. Another aim is to provide a drive system for the band structure that comprises a series of easily replaced drive shoes, said shoes having relatively strong durable connections to the band structure. A further aim is to provide a band structure that utilizes circumferential beads and cords or plies for transferring the load to the resilient core.

THE DRAWINGS

FIG. 1 is an elevational view of a band structure incorporating my invention.

FIG. 2 is a view taken on line 2—2 in FIG. 1.

FIG. 3 is a schematic side elevational view of the FIG. 1 band structure showing same installed on a vehicle.

FIGS. 4, 5 and 6 are sectional views taken on lines 4—4, 5—5 and 6—6 in FIG. 3.

Figure 7:
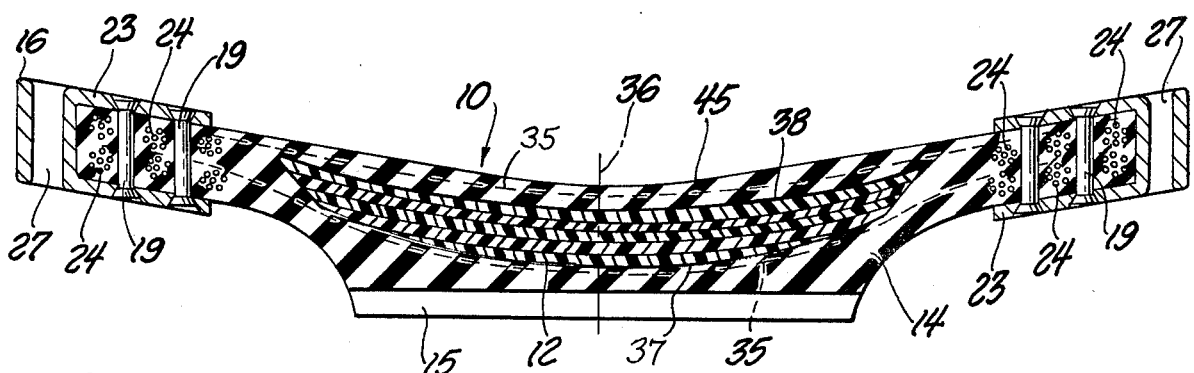

FIG. 7 is a view taken in the same direction as FIG. 2, but showing internal details.

Figure 8:
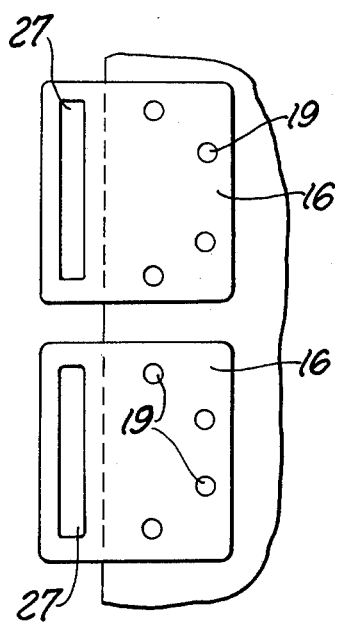

FIG. 8 is a fragmentary view of two drive shoes used in the FIG. 7 band structure.

Figure 9:
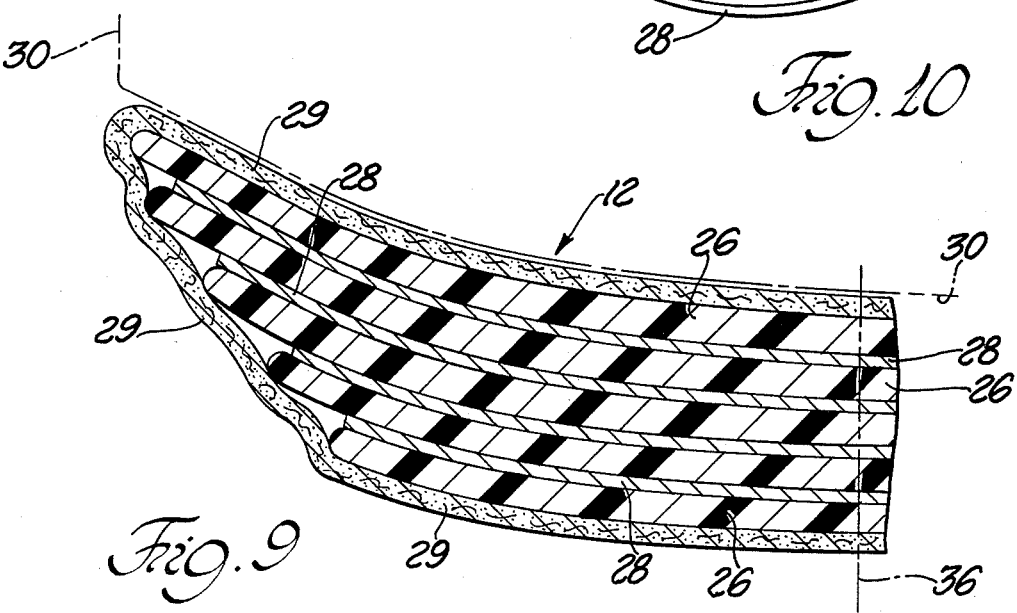

FIG. 9 is an enlarged cross sectional view taken through a resilient core contained in the FIG. 7 assembly.

Figure 10:
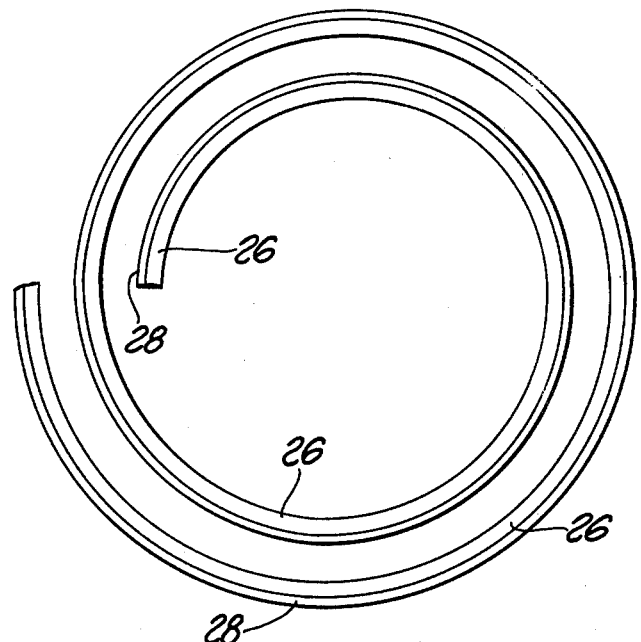

FIG. 10 is a schematic side view of the FIG. 9 resilient core in a partially wound condition.

Figure 11:
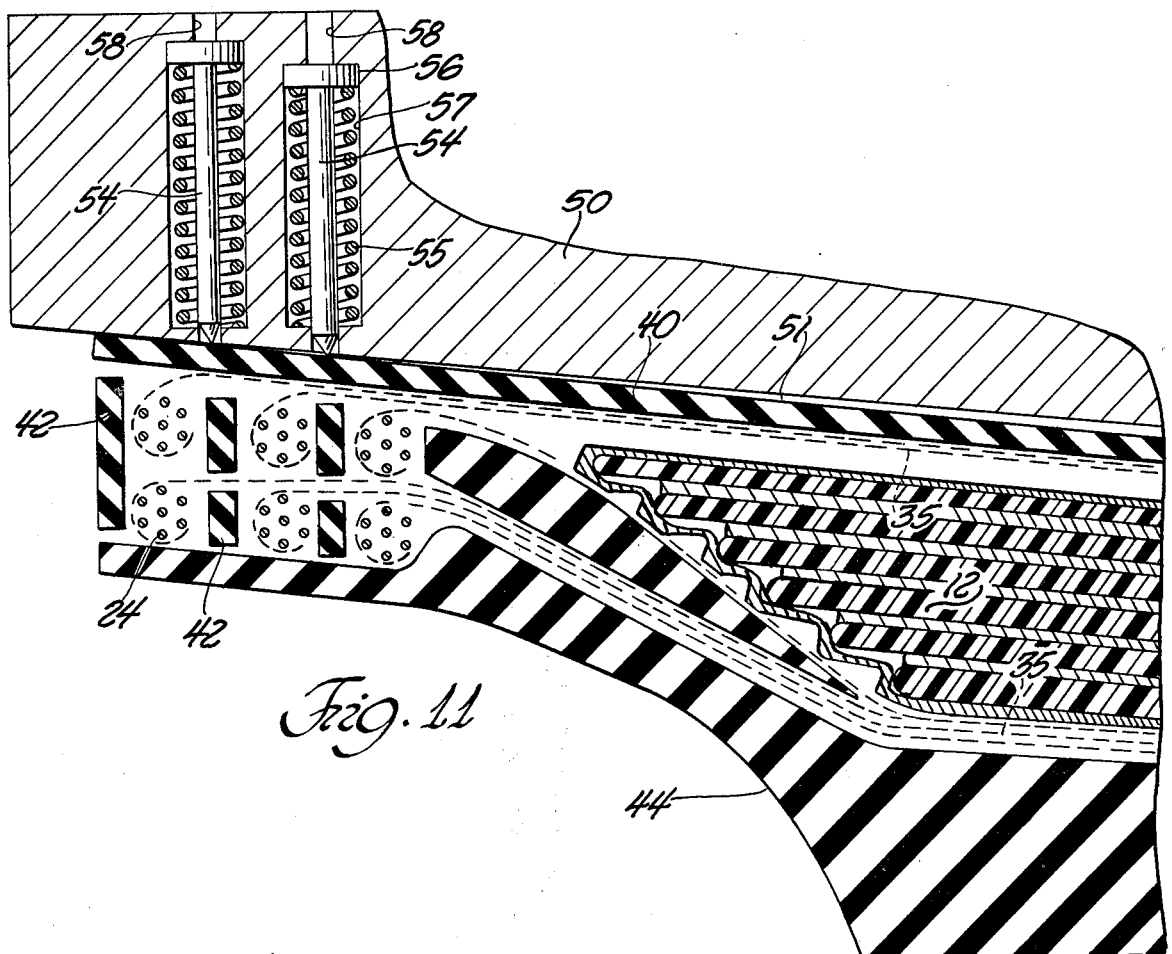

FIG. 11 is an exploded view of the FIG. 7 band structure components positioned on a forming mandrel.

Figure 12:
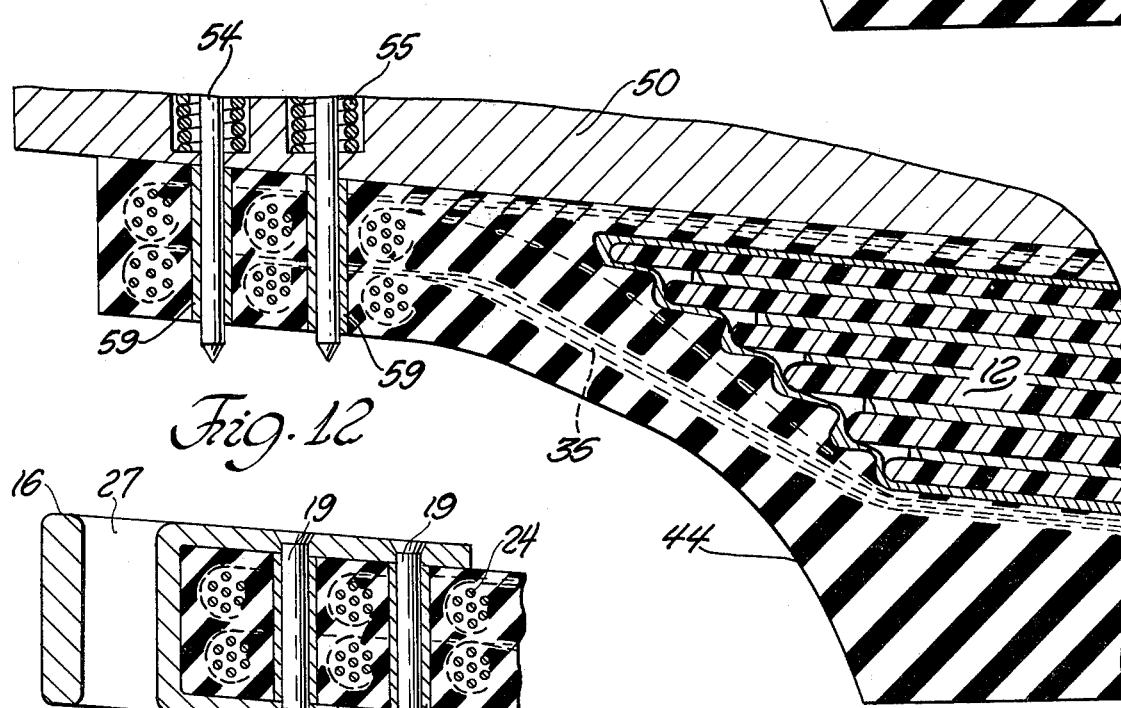

FIG. 12 is taken in the same direction as FIG. 11 after the components have been formed into a band structure.

Figure 13:
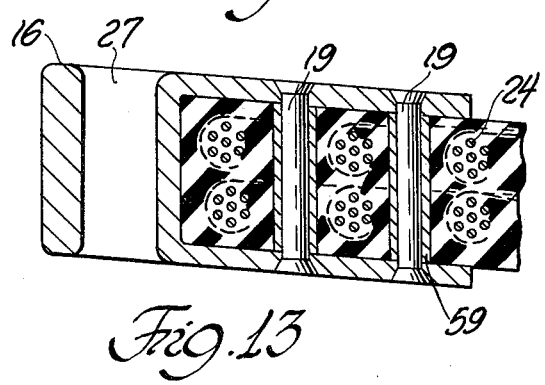

FIG. 13 is a fragmentary view of the FIG. 12 after attachment thereto of the drive shoes referenced in FIG. 8.

Referring in greater detail to FIGS. 1 through 6, there is shown an annular band structure 10 that includes an internal resilient core 12 and surrounding elastomeric sheath 14. The outer surface of sheath 14 defines a tread area 15 adapted to engage terrain 17 when the band structure is suitably installed on a vehicle. The band 10 major diameter will be determined by various factors, including the expected load and ground contact area. A representative diameter would be about forty inches.

FIG. 3 shows the resilient annular band 10 deformed into a generally elliptical configuration when mounted on a vehicle hull 11. Rotary load rollers 13 and 21 carried by the hull bear down on band 10 to deform it in longitudinal directions; spring-urged rollers 23 take up band slack and maintained the elliptical band envelope. Roller 13 incorporates sprockets whose teeth project through slot-like openings in edge areas of band 10 to orbit the band for thus moving the vehicle. Band 10 provides both resilient vehicle suspension and vehicle propulsion action. A complete vehicle would usually have four bands 10 arranged at the four corners of the vehicle.

Edge areas of band 10 are provided with non-extensible beads 24 similar to bead structures used in existing vehicle tires. When the band is installed on the vehicle the load forces cause resillient core 12 to have different transverse curvatures at different points along band 10. In the upper and lower runs 31 of the band structures core 12 has a relatively great transverse curvature as shown in FIGS. 4 and 6. In the return ends 33 of the band core 12 tends to flatten into a relatively slight transverse curvature as shown in FIG. 5. The flattened areas of the core depicted in FIG. 5 are highly stressed to provide the resilient vehicle suspension force. Non-extensible beads 24 transmit the load forces.

FIG. 7 illustrates certain interior details of the band structure, especially load transfer cords or plies 35 trained between beads 24 at opposite side edges of the band structure 10. Cords 35 are preferably weftless cords out of materials used for conventional tire cords, such as steel wire, aramid fibers and/or other organic fibers; the cords are dipped in a latex and calendered prior to incorporation into the band structure. The cords may be oriented substantially normal to the band centerline 36, or at acute angles to the centerline. Beads 24 are wires wound on a circular mandrel and coated with latex from an extruder, then wrapped with a rubber-coated fabric, as in conventional tire manufacture. The FIG. 7 band includes six beads 24 at each edge of the band structure for individually anchoring six cord plies 35. Four of the plies extend along convex outer surface 37 of resilient core 12, and two of the plies extend along concave inner surface 38 of core 12.

FIGS. 7 and 8 show band 10 equipped with a series of metal drive shoes 16 attached to each edge area of the band at regularly spaced points therealong. Each drive shoe has a channel cross-section fitting snugly around an edge of the band; rivet-type fasteners 19 extend between flange 23 of the individual shoes through elastomeric material 14 of the band to secure the shoes to the band structure. An elongated slot 27 in each shoe provides a driven connection to sprocket 13 shown in FIG. 3. Each shoe 16 is applied to the band after band formation to the FIG. 7 configuration.

Resilient core 12 comprises an elongated strip of resilient material 26, e.g. fiberglass, wound in spiral fashion around a circular mandrel 30 (FIG. 9) to define a continuous spiral leaf having a multiplicity of resilient leaf layers. FIG. 9 shows five leaf layers; in general heavier vehicles would require more leaf layers, and lighter vehicles would require less. The single strip of resilient material 26 has a relatively wide inner end and a relatively narrow outer end measured normal to centerline 36. Therefore, as the strip is wound on mandrel 30 the individual layers become progressively narrower from the strip inner end to the strip outer end. The transverse curvature shown in FIG. 9 is built into the resilient strip 26 at its point of manufacture, i.e. prior to being wound on mandrel 30.

Individual leaf layers defined by strip 26 are separated from one another by means of a relatively thin spacer sheet 28 of slippery material such as a silicon polymer or organic film known under the trademark Teflon (owned by DuPont). As shown in FIG. 10, sheet 28 is incorporated onto strip 26 prior to the spiral winding operation. During service spacer sheet 28 acts as an internal lubricant for the resilient core to minimize undersired adhesion between the leaf layers.

In some cases the resilient core 12 might have useful life after the elastomeric sheath 14 has worn out. To permit re-use of core 12 in a new elastomeric sheath I provide an envelope 29 of non-porous slippery material, e.g. Teflon with rubber coating around the core outer surfaces. Envelope 29 may be applied to the surface of mandrel 30 and wrapped around the resilient core after the wind-up operation; alternately envelope 29 may be applied to core 12 after the spiral wind-up operation. Preferably the extreme outer end of resilient strip 26 is secured to the next innermost resilient leaf, as by means of a solvent type adhesive, rivets, etc.

FIGS. 11 and 12 show one way to form the FIG. 7 band structure. An expansible drum-type segmented mandrel 50 is used to build up the band 10 in a process similar to conventional tire-building processes. Mandrel 50 has a transverse convex crown 51 configured in accordance with the inner curvature to be formed on band 10. FIG. 11 shows various components exploded to illustrate the sequence of assembly onto mandrel 50. FIG. 12 shows the same assembly after build-up into a unitary structure, but prior to vulcanization in a non-illustrated mold. Band structure build-up involves the use of the pre-manufactured beads 24, plies 35 and resilient core 12, together with an inner elastomeric sheet 40, various elastomeric spacer strips 42, and outer tread material extrusion 44.

Drum mandrel 50 contains two rows of retractible spikes 54 near each of its two lateral edges. While band 10 is in the process of being formed each spike 54 is urged to its retracted position by a compression spring 55. Each spike includes a piston 56 slidable in a fluid cylinder 57; after band 10 has been formed pressurized hydraulic fluid can be supplied through ports 58 in drum 50 to drive the spikes outwardly through the elastomeric material of band structure 10. The extended spikes 54 form locator surfaces for tubular metal grommets 59 that may be driven into the elastomeric material from the surrounding area. Thereafter spikes 54 my be retracted and the segmented drum 50 collapsed to permit removal of band 10 from the forming apparatus. The band assembly is vulcanized in a heated split mold having an internal airbag of the type used in conventional tire curing operations. The aforementioned treat 15 (FIG. 7) may be formed by the outer sections of the mold. After the vulcanizing operation the various drive shoes 16 may be rivetted to edge areas of band 10. As shown best in FIG. 13, grommets 59 serve as guides for individual rivets 19. The arrangement is such that rivets 19 can be drilled out or otherwise destructed if it becomes necessary to replace a worn drive shoe or to save an otherwise usable drive shoe for use with a second band structure 10.

When the band structure is installed on a vehicle its resilient core 12 will experience different deflections, as shown in FIGS. 4,5, and 6. During deflection of core 12 the six plies 35 act as positive mechanism for transferring load from the non-extensible beads 24 to the core. During movement of core 12 toward the FIG. 5 flattened condition the plies 35 along the inner surface of the core are placed in tension. As the core moves toward the FIG. 4 condition the plies 35 along the outer surface of the core are placed in tension. FIGS. 7, 11 and 12 contemplate a load transfer system that includes twelve beads 24 and six plies 35. The number of bead-ply assemblies will vary with the loads imposed thereon by the vehicle. The relative dimensions of the various component parts may be varied within limits. However, the inner surface 45 of the band is concave in the transverse direction, as shown in FIG. 7. The tread section 15 has approximately the same transverse width as resilient core 12. Elastomeric sheath 14 surrounds core 12 and also extends laterally to provide wing sections for encapsulating the bead wires 24. Core 12 includes a series of resilient leaves or layers that are of progressively decreasing length in the transverse direction. Individual leaves deflect in sequence, beginning from the widest (inner) leaf to the narrowest (outer) leaf, in the fashion of conventional leaf springs used in automotive-truck environments. The action provides a variable rate spring system having a relatively large deflections at low force inputs and a snubber action at maximum force input. The multi-leaf spring 26 is adapted to resist shock loads without buckling or snap through effects.

I wish it to be understood that I do not desire to be limited to the exact details of construction shown and described for obvious modifications will occur to a person skilled in the art.

I claim:

1. An annular resilient band structure designed for installation on a ground vehicle to provide tractive propulsion force and vehicle suspension function: said band structure comprising an annular resilient core having a transverse curvature that is convex on its outer surface and concave on its inner surface; first and second substantially inextensible bead structures outboard from the lateral edges of the core; first load transfer cord means extending from the first bead structure to the second bead structure along the outer surface of the resilient core; second load transfer cord means extending from the first bead structure to the second bead structure along the inner surface of the resilient core; and an elastomeric sheath surrounding the core, bead structures and cord means; said resilient core comprising an elongated strip of resilient material (26) wound in spiral fashion to define a continuous spiral leaf having a multiplicity of resilient leaf layers; said strip of resilient material having a relatively wide inner end and a relatively narrow outer end, the lateral side edges of the strip becoming progressively narrower from the strip inner end to the strip outer end so that individual leaf layers have progressively narrower transverse widths measured from the inner layer to the outer layer.

2. The band structure of claim 1: the resilient core comprising a spacer sheet of slippery material positioned on one face of the resilient strip so that when the strip is wound spirally the spacer sheet will act to minimize undesired adhesion effects between the resilient leaf layers.

3. The band structure of claim 1, and further comprising an envelope of slippery non-porous material closely encircling the core to permit re-use of the core in event of service wear-out of the elastomeric sheath.

4. An annular resilient band structure designed for installation on a ground vehicle to provide tractive propulsion force and vehicle suspension function: said band structure comprising an annular resilient core having a transverse curvature that is convex on its outer surface and concave on its inner surface; first and second substantially inextensible bead structures outboard from the lateral edges of the core; first load transfer cord means extending from the first bead structure to the second bead structure along the outer surface of the resilient core; second load transfer cord means extending from the first bead structure to the second bead structure along the inner surface of the resilient core; an elastomeric sheath surrounding the core, bead structures and cord means; and drive shoes attached to edge areas of the band structure at regularly spaced points therealong; each drive shoe having a channel cross-section fitting snugly around an edge of the band structure, and fasteners extending through the channel flanges and the band elastomeric material to retain the drive shoes on the band structure; each drive shoe having an elongated slot through a zone of the shoe located outwardly from the edge of the band structure to be drivingly engaged with teeth on a drive sprocket carried by the vehicle; each of the first and second bead structures comprising a plurality of individual beads spaced from each other at an edge of the band structure; each of the first and second load transfer cord means comprising a number of individual fabric plys anchored to individual ones of the beads at opposite edges of the band structure.

5. The band structure of claim 4: said elastomeric sheath including a tread section on the outer convex surface of the resilient core; said tread section having approximately the same transverse width as the core; said elastomeric sheath including wing sections located outboard from the core edges to contain the aforementioned bead structures; the aforementioned drive shoes fitting onto exposed edge areas of the elastomeric wing sections.

* * * * *